Sept. 12, 1950      H. F. STORM      2,521,880
CONTROL SYSTEM FOR HIGH-FREQUENCY
INDUCTION HEATING APPARATUS
Filed Sept. 25, 1946      2 Sheets-Sheet 1
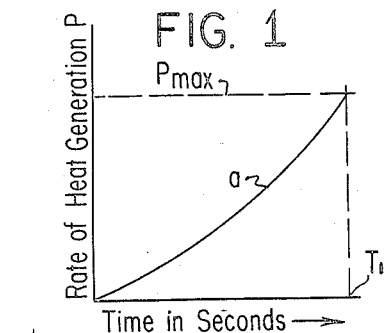
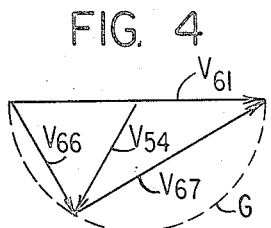
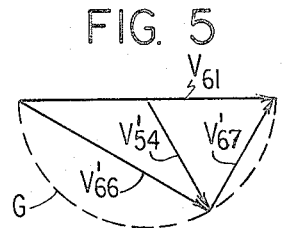
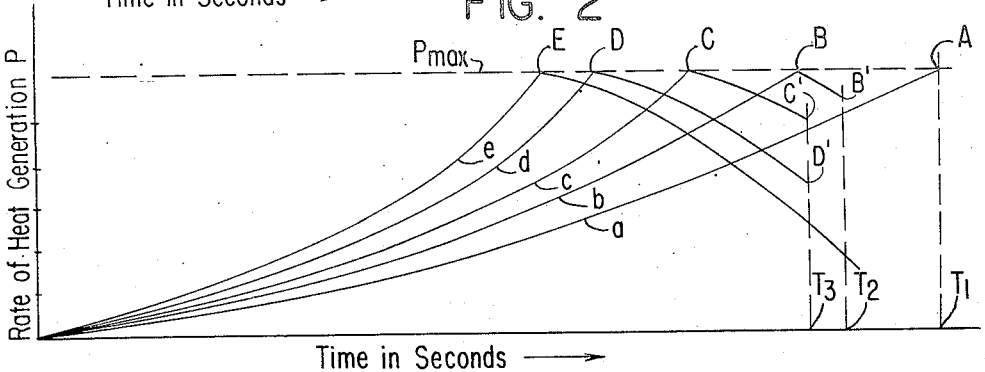
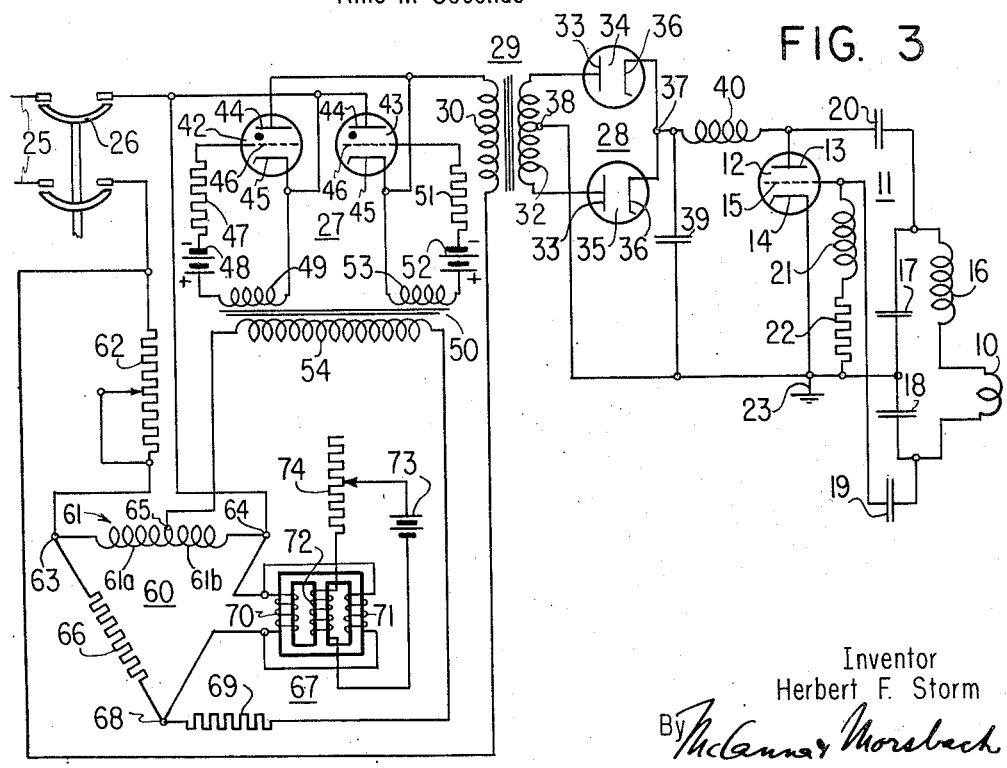
Inventor
Herbert F. Storm
By McCanna & Morsbach
Attorneys Sept. 12, 1950   H. F. STORM   2,521,880
CONTROL SYSTEM FOR HIGH-FREQUENCY
INDUCTION HEATING APPARATUS
Filed Sept. 25, 1946   2 Sheets-Sheet 2

Inventor
Herbert F. Storm
By McCanna & Morsbach
Attorneys

Patented Sept. 12, 1950

2,521,880

UNITED STATES PATENT OFFICE 2,521,880

CONTROL SYSTEM FOR HIGH-FREQUENCY INDUCTION HEATING APPARATUS

Herbert F. Storm, Scotia, N. Y., assignor to Sunbeam Corporation, Chicago, Ill., a corporation of Illinois Application September 25, 1946, Serial No. 699,196

8 Claims. (Cl. 219—47)

The present invention relates to a control arrangement for a high frequency heating device and more particularly to a control arrangement for a high frequency generator for insuring operation of the high frequency generator at high efficiency.

Induction heating devices are extensively used in many manufacturing operations. The heat generated by induction in a particular work piece or charge depends on a number of parameters such, for example, as the current flowing in the inductor or heating coil, the frequency of this current, the shape of both the work piece and the inductor coil and also the permeability and electrical resistivity of the work piece or charge. Mathematically, the rate of heat generation or the heat generated per unit of time in a high frequency induction heating device can be represented by the following equation:

$$P = Ki^2 \sqrt{f \mu \rho}$$

where $P$ is the heating rate in B. t. u.'s per second; $K$ is a constant; $i$ is the current in amperes flowing in the inductor or heating coil; $f$ is the frequency of the current $i$; $\mu$ is the permeability in webers per ampere-turn per centimeter of the work piece or charge to be heated; and $\rho$ is the resistivity of the work piece in ohms per cubic centimeter. In view of the fact that most materials have a positive temperature coefficient of electrical resistivity, it is apparent from the equation that the heat generated in the charge will vary with temperature. As the temperature increases during a heating cycle, the electrical resistivity for a material having a positive temperature coefficient also increases and hence the rate of heat generation by induction increases.

High frequency generators which are used in induction heating devices and which generally comprise oscillation generators should be utilized to the maximum extent during a heating cycle in order to utilize the invested capital, and to increase the efficiency as will be explained hereinafter. Accordingly, it is desirable to attempt to load the generator as high as is permissible throughout the heating cycle. It is, however, important that the load on the oscillation generator does not exceed a predetermined maximum. If one were to plot the rate of heat generation in a charge as a function of time, the curve would start at zero and increase with time due to the increasing electrical resistivity of the charge with temperature, assuming that all other variables remained constant. It is therefore apparent that in such a case during most of the heating cycle the oscillation generator is operated far below its permissible maximum which is attained only as the end temperature of the work piece is reached. It would be desirable to increase the utilization of the generator, thereby decreasing the heating time for each particular charge or work piece with the resultant increase in production and efficiency of the induction heating unit.

Accordingly, it is an object of the present invention to increase the utilization of a generator supplying high frequency energy for induction heating purposes so that the generator is operated more efficiently throughout the entire heating cycle.

It is another object of the present invention to provide an induction heating unit in which the generator supplying the high frequency energy reaches its maximum output before the work piece reaches its desired end temperature.

It is another object of the present invention to provide an automatic control arrangement for a high frequency heating device in which the load on the high frequency generator is prevented from exceeding a predetermined value and yet wherein the efficiency of the generator is increased above that of prior art devices.

It is a further object of the present invention to provide an automatic control arrangement for a high frequency heating unit employing a high frequency generator in order to tend to maintain constant the power output of the high frequency generator throughout the heating cycle.

Further objects and advantages of the present invention will become apparent as the following description proceeds and the features of novelty which characterize this invention will be pointed out with particularity in the claims annexed to and forming a part of this specification.

For a better understanding of the present invention, reference may be had to the accompanying drawings in which:

Figs. 1 and 2 are curve diagrams to aid in understanding the present invention;

Fig. 3 is a schematic diagram illustrating a high frequency heating device embodying the present invention;

Figs. 4 and 5 are vector diagrams to aid in understanding the operation of the heating device of Fig. 3;

Figure 6:
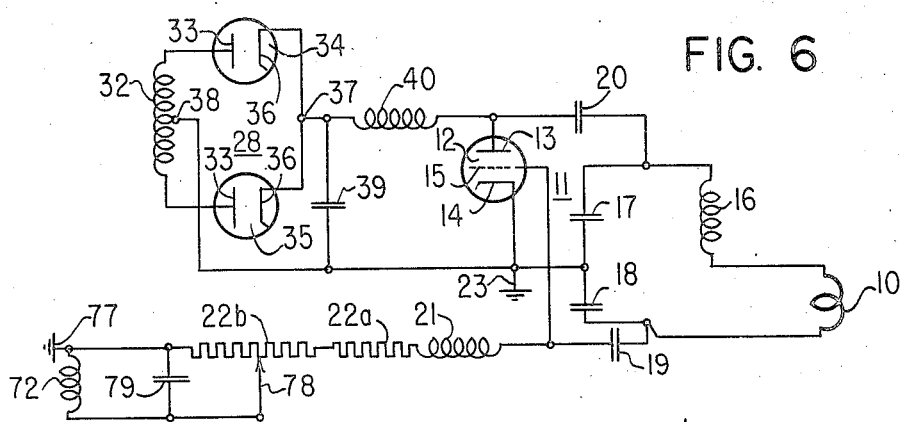
Fig. 6 is a schematic diagram of a portion of Fig. 3 of the drawings illustrating a modification of the present invention.

The present invention is primarily concerned with an automatic control arrangement for a high frequency heating device in which the rate of heating is controlled so that maximum power is transmitted before the charge or work piece has reached its desired end temperature, whereby the generator is utilized more efficiently than when maximum power is transmitted only when the desired end temperature is reached. This is based primarily upon the fact that the electrical resistivity of the charge or work piece increases with temperature so that the heating of the charge increases as the work piece becomes hotter. This is true for all materials having a positive temperature coefficient of electrical resistivity except ferromagnetic materials and is even true for ferromagnetic materials so long as the end temperature is below the recalescent point. In my copending application, Serial No. 699,197, filed concurrently with the present application and assigned to the same assignee as the present application, there is disclosed and claimed an arrangement for controlling a high frequency heating device which specifically takes into consideration the change in the rate of heating with the great change in permeability occasioned when a ferromagnetic charge or work piece reaches its recalescent point.

Referring now to Fig. 1 of the drawings, there is illustrated a curve $a$ which shows the rate of heat generation P as a function of time. This curve is plotted for the conventional induction heating device in which the rate of heating increases until the time $T_1$ when the desired end temperature of the work piece is reached and which represents the maximum permissible rate of heating $P_{max}$. It is apparent that during most of the heating cycle and certainly during the first part of the heating cycle the generator supplying the power is not operated very efficiently.

In accordance with the present invention, in order to produce a high utilization of the high frequency generator, the inductor or heating coil is designed to transmit maximum power at a temperature below the desired end temperature of the work piece. As soon as the temperature at which maximum power is transmitted is reached, the inductor current must be reduced in order to prevent overloading of the generator due to further increase of the load resistance with increase in temperature by virtue of increased electrical resistivity. This can be more clearly understood by reference to Fig. 2 of the drawings in which the curve $a$ of Fig. 1 is redrawn to a slightly different scale, thereby enabling the principle propounded hereinafter to be explained in greater detail. As time increases, the rate of heat generation also increases and it reaches its peak $P_{max}$ at A in the time $T_1$ when the charge or work piece attains its final end temperature. If now the design of the output circuit were changed in order to increase the rate of heat generation by a predetermined amount, the heat generator for this changed arrangement can be represented by the curve $b$ in Fig. 2 of the drawings. Due to the greater power input, the temperature of the charge rises faster than was the case in connection with curve $a$. The maximum permissible loading of the generator is reached at the point B. It is obvious that if the heating were continued without any readjustment of the generator, the latter would become overloaded. In order to avoid this condition, means are provided, as will become apparent from the following description, for reducing the output of the generator. The rate of heat generation will be reduced as shown by the curve $b$ between the points B and B'. During this time the heating rate is decreased below the maximum heating rate, but it is still greater than the heating losses during this period so that the temperature of the charge increases until the desired end temperature is reached at the point B'. The end temperature of the work piece attained by using the curves $a$ and $b$ are the same but an examination of these curves in Fig. 2 of the drawings indicates that the end temperature of curve $a$ is reached in the time $T_1$ while the end temperature in the case of curve $b$ is reached in the time $T_2$ which is considerably less than the time $T_1$. It is apparent then that the utilization of the generator has been greatly increased since the same work has been accomplished in a shorter period of time and yet the permissible maximum rate of heating $P_{max}$ has not been exceeded.

If the design of the output circuit were changed still further so as to transmit still more power during the earlier stages of the heating cycle, a curve such as curve $c$ results in which the maximum rate of heating occurs at point C and heating at a reduced rate occurs between the points C and C'. The desired end temperature is reached in the time $T_3$ which is still less than the time $T_2$ thus indicating that an even greater utilization of the high frequency generator is obtained. If the design of the output circuit is changed again so that maximum loading is reached at the point D, as represented by the curve $d$, then between D and D' the rate of heating is reduced. Since a comparatively large amount of power must be transmitted after the maximum rate of heating at point D is reached and this heating occurs at a lower output level, a greater amount of time will be required to bring the charge to the desired end temperature. It should be noted at this point that the heat loss per unit time increases with the temperature of the work piece by virtue of the higher temperature differential, thus decreasing the excess of the transmitted heat over the heat loss. The result is that the time that heat must be supplied at a reduced rate becomes progressively longer as the maximum rate of heating is reached earlier and earlier during the cycle. In the case of curve $d$ no time was gained relative to curve $c$ since both required the time $T_3$ to reach the same end temperature of the work piece. If the power transfer is stepped up still further so that the maximum rate of heating $P_{max}$ is reached earlier in the cycle as for example in the manner indicated by the curve $e$, it will be apparent that a point is reached at which the heat generated during the reduced heating period after the point E on curve $e$ is reached when the heat generated in the charge equals the heat loss from the charge. If this condition exists before the desired end temperature is attained, it is apparent that it will never be attained. Consequently, an indiscriminate increase in the rate of heat generation early in the heating cycle will not necessarily reduce the total time required for the heating cycle which in the final analysis is the desired result. In other words, there is a definite optimum rate of heat generation for which the total heating time becomes a minimum which constitutes the most advantageous adjustment for the induction heating device if maximum production is desired. Accordingly, the high frequency heating devices described hereinafter are all concerned with an arrangement for automatically controlling the particular point such as C or D during the heating cycle at which the maximum permissible rate of heating is attained after which this rate is reduced so that the heating operation is completed and the desired end temperature is reached in the minimum period of time.

Referring now to Fig. 3 of the drawings, there is illustrated a high frequency heating arrangement which permits of controlling the rate of heat generation so that the high frequency generator may be operated in accordance with a curve such as $c$ or $d$ of Fig. 2 of the drawings in preference to curves such as $a$ or $b$. It should be understood that any suitable high frequency generator may be employed. Since it is customary for such high frequency generators to be of the high vacuum tube oscillator type, the present invention has been particularly illustrated in connection with such a generator.

In Fig. 3 of the drawings there is illustrated a control circuit for a high frequency induction heating device comprising an inductor or heating coil 10 which usually comprises a one turn water-cooled coil of the type disclosed in my copending application, Serial No. 652,756, filed March 7, 1946, and assigned to the same assignee as the present application.

For the purpose of energizing the inductor or high frequency heating coil 10 with high frequency current so that the work piece or charge, not shown, associated therewith is heated in an efficient and high speed manner, there is provided an oscillation generator generally indicated at 11. It should be understood that any suitable means for providing high frequency energy to the inductor or heating coil 10 may be employed and accordingly, the oscillation generator 11 may comprise any standard form of generator for producing high frequency oscillations. In Fig. 3 of the drawings this generator has been illustrated as comprising the well known Colpitts oscillator including an electron discharge valve or vacuum tube 12 having an anode or plate 13, a cathode 14 and a control electrode or grid 15. The oscillating action of the electron discharge valve 12 is controlled by a tuned or resonant circuit generally referred to as a tank circuit comprising a serially arranged inductance 16 and the inductor or heating coil 10 connected in parallel with a pair of serially arranged capacitors 17 and 18. This tank circuit comprising the elements 10, 16, 17 and 18 is connected with the electron discharge valve 12 in the following manner. The cathode 14 of the electron discharge valve 12 is connected to a point on the tank circuit between the capacitors 17 and 18 which act as a voltage divider. The lower terminal of the tank circuit is connected to the control electrode or grid 15 through a grid blocking capacitor 19. This connection from the tank circuit to the control electrode 15 provides the feed-back circuit which is a capacitive feed-back circuit. The upper terminal of the tank circuit is connected to the plate or anode 13 through a plate blocking condenser 20 in order to insulate the anode or plate 13 from the control electrode or grid 15 in so far as the direct current potential applied to the anode-cathode circuit of the electron discharge valve 12 is concerned while still maintaining the plate 13 and the upper terminal of the tank circuit at the same high frequency potential. In order to provide the desired bias on the control electrode 15 of the electron discharge valve 12, there is provided a grid leak circuit connected between the cathode 14 and the grid 15 which comprises an inductance 21 serially arranged with a resistor 22. Preferably the cathode 14 is grounded as is indicated at 23.

It will be understood that the oscillation generator 11 of the type described thus far effectively converts direct current energy to high frequency alternating current energy. Consequently, it is necessary to supply the plate-to-cathode circuit of electron discharge valve 12 which will be referred to hereinafter as the input circuit of the oscillation generator 11 with a source of direct current potential. Any suitable source of direct current potential may be employed. In order to perform the desired control operations to be described hereinafter, however, there is provided a source of alternating current potential 25 which is connected to the input circuit of the oscillation generator 11 through a control device such as a circuit breaker or contactor schematically indicated at 26, an electron discharge device control unit generally indicated at 27, and a bi-phase rectifier unit generally indicated at 28. The bi-phase rectifier unit 28 converts the alternating current or potential from the source 25 to a direct current potential while the electron discharge control unit 27 controls the magnitude of the direct current potential applied to the input terminals of the oscillation generator 11.

As illustrated in Fig. 3 of the drawings, the rectifier unit 28 comprises a bi-phase rectifier including a rectifier transformer 29 having a primary winding 30 and a secondary winding 32. The end terminals of the secondary winding 32 are each connected to an anode 33 associated with a pair of electron discharge valves 34 and 35, respectively, which are indicated as ordinary rectifier tubes such as conventional diodes. Each of the electron discharge valves or diodes 34 and 35 are provided with a cathode 36 interconnected as indicated at 37 to provide one terminal of the output circuit of the rectifier unit 28. The other terminal of the output circuit of the rectifier unit 28 is the mid-tap 38 of the secondary winding 32 of the rectifier transformer 29. In order to smooth the output of bi-phase rectifier 28 to eliminate the ripple which would otherwise be included, there is provided a suitable by-pass condenser 39 connected across the output terminals of the rectifier to by-pass the ripple component of the output voltage and a suitable choke coil 40 to impede the passage of alternating current. This filter circuit also prevents the high frequency oscillations from passing into the rectifier unit 28.

The primary winding 30 of the rectifier transformer 29 is connected as was mentioned above to the alternating current source through the control device 26 and the electron discharge or electronic control unit 27. The electron discharge control unit 27, as was mentioned above, is provided in order to control the magnitude of the direct current potential applied to the input of the oscillation generator 11 and consequently to control the magnitude of the output of oscillation generator 11 which appears in the form of a high frequency current flowing through the inductor or heating coil 10. The electron discharge control unit 27 comprises a pair of electron discharge valves 42 and 43. These electron discharge valves are preferably of the type employing an ionizable medium such as a gas or a vapor. Examples of these valves are the thyratron or the ignitron. Each of the electron discharge valves 42 and 43 is provided with an anode 44, a cathode 45, and a control electrode 46. These electron discharge valves are connected in back-to-back relationship in series with the primary winding 30 of the rectifier transformer 29.

By that is meant that the anode 44 of the electron discharge valve 42 is connected to the cathode 45 of the electron discharge valve 43. Similarly, the anode 44 of the electron discharge valve 43 is connected to the cathode 45 of the electron discharge valve 42. When these valves are rendered fully conducting a path is provided for both half cycles of the alternating current from the source 25 so that the alternating current power reaches the primary winding 30 of the rectifier transformer 29 with little or no voltage drop and the rectifier unit 28 will have a maximum direct current output with the result that the oscillation generator 11 will operate at maximum power output. In other words, under these conditions the control arrangement functions as if the electron discharge unit 27 were omitted from the circuit. It is apparent that by means of a suitable control potential applied to the grids or control electrodes 46 of the electron discharge valves 42 and 43, the instant of firing during the alternating current cycle of these electron discharge valves can be controlled as desired. By advancing the phase of the grid potentials applied to the control electrodes 46 relative to the anode or plate voltages applied to the anodes 44, the electron discharge valves 42 and 43 can be fired or rendered conducting early in the cycle with the result that a greater plate potential is available at the input terminals of the oscillation generator 11 than in the case where the phase of the grid potentials applied to the control electrodes 46 is retarded. Consequently, oscillations of greater amplitude will result or in other words, the high frequency current flowing in the inductor or heating coil 10 will have a greater amplitude. Conversely by retarding the phase of the grid voltage of the electron discharge valves 42 and 43 the magnitude of the current flowing in the inductor 10 is decreased.

In order to control the phase of the grid potentials applied to the control electrodes 46 of the electron discharge valves 42 and 43, these control electrodes are provided with a suitable control circuit as follows. The control electrode 46 of the electron discharge valve 42 is connected to its associated cathode 45 through a current limiting resistor 47, a bias battery 48 and the secondary winding 49 of a suitable grid transformer designated at 50. Similarly, the control electrode 46 of the electron discharge valve 43 is connected to its associated cathode 45 through a current limiting resistor 51, a bias battery 52 and a secondary winding 53 also forming a part of the grid transformer 50 which is provided with a primary winding 54 inductively coupled to the secondary windings 49 and 53. When the primary winding 54 is energized with an alternating current potential then there are induced in the secondary windings 49 and 53 alternating current potentials which are displaced from each other by 180 electrical degrees. It is quite obvious that the electron discharge valve 42 will be rendered conducting during one-half cycle of the alternating current from potential source 25 while the electron discharge valve 43 will be rendered conducting during the other half cycle of the alternating current potential. Whenever one of these electron discharge valves 42 or 43 has its associated control electrode 46 rendered sufficiently positive the valve is rendered conducting. The bias batteries 48 and 52 provide the desired negative bias to prevent electron discharge valves 42 and 43 from being rendered conducting unless an additional grid voltage is superimposed on the control electrodes 46 from the grid transformer 50. By varying the phase of the alternating current potential applied to the primary winding 54 of the grid transformer 50 relative to the potential of the alternating current source 25, the conductivity of the electron discharge valves 42 and 43 may be controlled in any desired manner.

For the purpose of supplying primary winding 54 of the grid transformer 50 with an alternating potential which may be varied in phase relative to the alternating potential of the source 25, there is provided a phase shifting unit or device generally indicated at 60. It should be understood that the construction of the phase shifting device 60 forms no part of the present invention and may comprise any conventional phase shifting device. To illustrate the invention, however, the phase shifting device 60 is shown as of the type disclosed in Alexanderson Patent No. 1,719,866 including a winding 61 connected across potential source 25 through a suitable adjustable resistor 62. The winding 61 is provided with end taps 63 and 64 and a mid-tap 65. The portion of the winding 61 between taps 63 and 65 is designated as 61a, while the portion between the taps 65 and 64 is designated as 61b. A bridge circuit is defined with two of the legs comprising winding portions 61a and 61b while the other two legs comprise a resistor 66 and a variable inductance generally indicated at 67 which latter two legs are connected together at a junction point or terminal 68. The resistor 66 is connected between the terminals 63 and 68 while the variable inductance 67 is connected between the terminals 64 and 68. The terminals 65 and 68 provide the output terminals for the bridge circuit of the phase shifting device 60 and are connected across the primary winding 54 of the grid transformer 50 through a suitable current limiting resistor 69 if desired.

The variable inductance 67 is illustrated as a saturable reactor which comprises alternating current windings 70 and 71 which are connected in parallel across the terminals 64 and 68 of the bridge circuit of phase shifting network 60. The saturable reactor 67 also includes a saturating winding 72 which is connected in series with a suitable source of potential such as the battery 73 through a suitable variable or control resistor 74. It will be understood that when the resistor 74 is varied so that a large saturating current flows in the saturating winding 72 that the inductance of the leg of the bridge circuit between the terminals 64 and 68 is decreased. On the other hand, when the current flowing in the saturating winding 72 is decreased by varying the resistance of the resistor 74 the inductance of this leg of the bridge circuit is increased.

The operation of the phase shifting unit or device 60 will be apparent from an examination of the vector diagrams shown in Figs. 4 and 5 of the drawings. These vector diagrams represent the voltage conditions existing across the legs of the bridge circuit of the phase shifting device 60 at two different values of the current flowing in the saturation winding 72 of the saturable reactor 67. Each vector is designated by the letter V in Fig. 4 of the drawings marked with an appropriate subscript corresponding to the particular leg of the bridge circuit of Fig. 3 of the drawings. The same nomenclature is used in Fig. 5 of the drawings except that the voltage vectors other than $V_{61}$ are designated with a prime in order to distinguish them from the corresponding vectors in Fig. 4 of the drawings. Referring specifically to Fig. 4 of the drawings, the vector $V_{61}$ represents the instantaneous voltage of the source 25 as applied across the terminals 63 and 64 of the winding 61. It will be apparent that half of this voltage will appear across the section 61a of the winding and the other half will appear across the section 61b of the winding. The voltage vectors $V_{66}$ and $V_{67}$ which are displaced from each other by 90 electrical degrees represent the voltages across the resistor 66 and the saturable reactor 67 respectively for one value of current flowing through the saturating winding 72. The vector $V_{54}$ is the output voltage obtained across the primary winding 54 of the grid transformer 50 for the particular current flowing through the saturating winding 72 of the saturable reactor 67. The corresponding vectors marked with a prime in Fig. 5 of the drawings represent the same voltages for a different current condition with respect to the saturating winding 72. It is apparent that by varying the current flowing in the saturating winding 72 and consequently by varying the inductance of the leg of the bridge circuit between the terminals 64 and 68 the voltage vectors $V_{66}$ and $V_{67}$ vary in magnitude and phase. They are, however, always displaced from each other by 90 electrical degrees and the junction point of these two vectors always remains on the dotted curve G which is a semicircle. With this arrangement, the phase of the voltage represented by the vector $V_{54}$ in Fig. 4 of the drawings and $V'_{54}$ in Fig. 5 of the drawings may vary widely through an angle of substantially 180 degrees from a value in phase with the voltage of the source 25 represented by the vector $V_{61}$ which is the most advanced phase position to more and more retarded phase positions relative to the voltage $V_{61}$. Since a high saturating current in the winding 72 causes a decrease in inductance of the alternating current windings 70 and 71 of the saturable reactor 67 a low voltage will appear across this leg of the bridge circuit. This condition is represented by Fig. 5 of the drawings which indicates that an increase in the saturating current flowing in the winding 72 causes an advance in the phase of the voltage across the winding 54 since the vector $V'_{54}$ in Fig. 5 is substantially in phase with the vector $V_{61}$ or at least much more nearly in phase than is the vector $V_{54}$ of Fig. 4 of the drawings relative to this same source voltage $V_{61}$. Fig. 4 represents the condition when the saturating current flowing in the winding 72 is relatively low whereby the saturable reactor presents a high inductance between the terminals 64 and 68 of the bridge network.

From the above discussion, it will be apparent that by varying the resistance of resistor 74 there is produced a variation of the firing angle of the electron discharge valves 42 and 43 so as to increase or decrease the voltage applied to the input circuit of the oscillation generator 11. If the resistance of the resistor 74 were automatically controlled by means of a program timer or the like, then the output of the oscillation generator 11 would be controlled in the optimum manner as was described above in connection with Fig. 2 of the drawings whereby the inductor 10 is caused to transmit maximum power at a time when the temperature of the work piece is below the desired end temperature thereof whereby the total heating time to reach the desired end temperature is a minimum without ever exceeding the maximum heating rate. In view of the detailed description included above, the operation of the control arrangement for the high frequency heating device will be obvious to those skilled in the art and no further discussion thereof will be included herewith. It should be understood that similar results can be obtained by varying the resistance of the resistor 66 and permitting the inductance of the reactor 67 to remain constant.

Instead of controlling the current flowing in the inductor coil 10 by manually varying the resistance of the resistor 74 or by controlling the resistance of the resistor 74 through a suitable program timer of some sort, automatic control responsive to some characteristic or function of the oscillation generator 11 may be employed. Such an arrangement is shown in Fig. 6 of the drawings where only a portion of the control circuit of Fig. 3 is illustrated. However, since a large portion of it is identical with that of Fig. 3 of the drawings, it has been omitted and as far as the parts shown in Fig. 6 which correspond to the parts shown in Fig. 3 are concerned, the same reference numerals are applied. The grid leak resistor 22 is illustrated as being comprised of two parts 22a and 22b grounded at 77 as clearly indicated in Fig. 6 of the drawings thereby being effectively connected to the cathode 14 of the electron discharge valve 12 which is also grounded at 23. In order to obtain the direct current for the saturating winding 72, the resistor 22b is provided with a variable tap 78 which is connected to one terminal of the saturating winding 72. The other terminal of the saturating winding 72 is connected to one end of the resistor 22b such as the ground point 77. A suitable capacitor 79 is provided connected across the saturating winding 72 to by-pass high frequency components so that the saturating winding 72 is supplied substantially with a direct current potential. It will be understood that if the load on the oscillation generator 11 increases or is too high, the grid current of the electron discharge valve 12 decreases. Consequently, if the load is high the grid current is low and the current flowing through the saturating winding 72 taken from resistor 22b is low thereby increasing the impedance of saturable reactor 67, thus retarding the phase of the potential applied to the grid transformer 54 relative to the potential of the source 25 and consequently decreasing the output. Conversely if the degree of loading of the oscillation generator 11 decreases, the grid current increases, thereby increasing the saturation of the saturable reactor 67 by increasing the current flowing through the winding 72 and decreasing the inductance of the leg of the bridge circuit between the terminals 64 and 68. This decrease in inductance as is apparent from Figs. 4 and 5 of the drawings advances the phase of the voltage applied to the control electrodes 46 of the electron discharge valves 42 and 43 relative to the plate voltages thereof so as to increase the load on the oscillation generator 11, thereby automatically providing the desired regulation.

Figure 7:
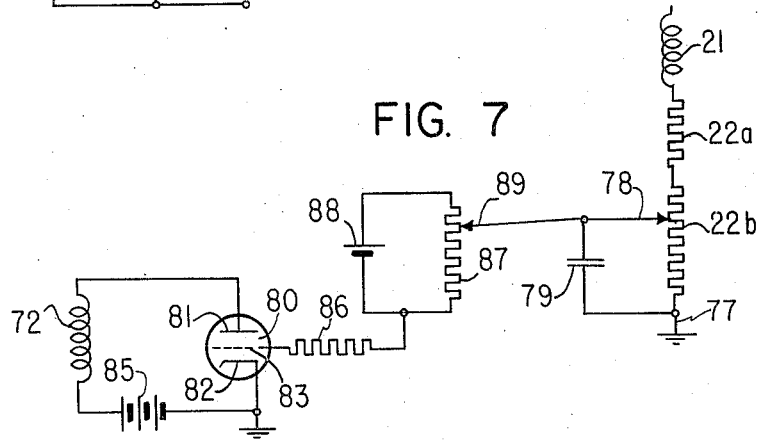
Fig. 7 is a schematic diagram of a portion of Fig. 4 of the drawings illustrating still another modification of the invention.

It may be undesirable to draw power from the grid circuit of the electron discharge valve 12 to control the saturation of the saturable winding 72. Accordingly, in Fig. 7 there is disclosed an arrangement substantially identical with that disclosed in Fig. 6 of the drawings which eliminates the requirement of drawing power from the grid circuit of the electron discharge valve 12 and which furthermore provides an amplification arrangement by employing a high vacuum tube which has characteristics to produce very sensitive control of the plate voltage of the oscillation generator 11. As illustrated in Fig. 7 of the drawings where the corresponding parts are designated by the same reference numerals as in the preceding figures, the saturation winding 72 is connected in the plate circuit of an electron discharge valve 80 having an anode 81, a cathode 82 and a control electrole or grid 83. A suitable source of direct current potential illustrated as a battery 85 is also connected in series with the saturation winding 72 and the electron discharge valve 80. The control electrode 83 of the electron discharge valve 80 is connected through a suitable resistor 86 to a potentiometer 87 having a direct current potential applied thereacross from a bias battery 88. A suitable signal voltage obtained from the variable tap 78 associated with the grid resistor 22b is balanced against the voltage from the battery 88 by being applied to the potentiometer 87 through the variable tap 89. The differential voltage between the battery 86 and the voltage obtained from the resistor 22b is actually the voltage applied to the control electrode 83. The operation of the arrangement disclosed in Fig. 7 is identical with that of Fig. 6 of the drawings except that the current for the saturating winding 72 is supplied from the battery 85 and controlled by the electron discharge valve 80 in response to the potential on the resistor 22b rather than being directly controlled by this potential so as to draw grid current from the electron discharge valve 12 to supply the current for the saturating winding 72.

Figure 8:
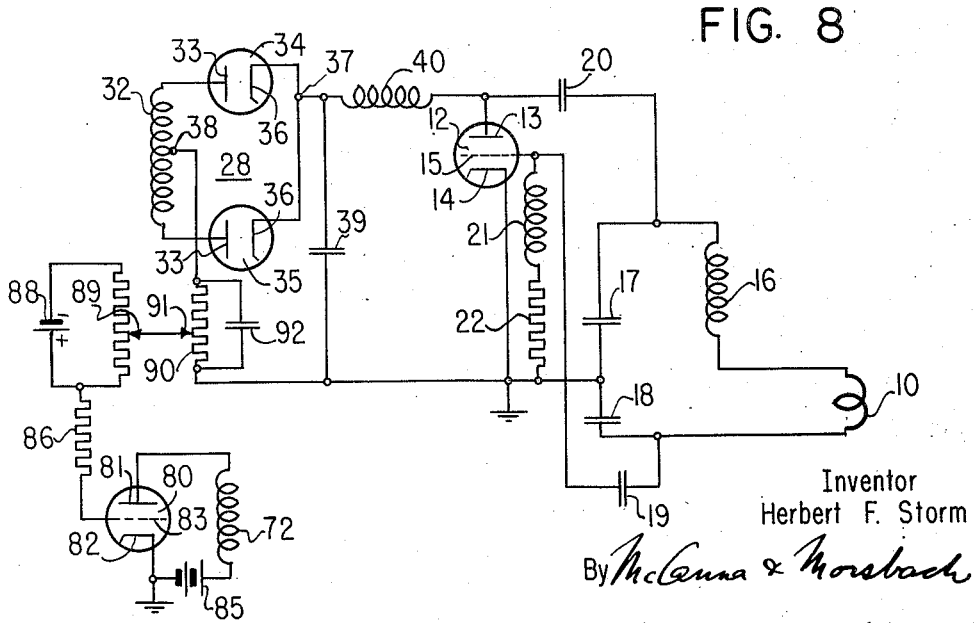
Fig. 8 is a schematic diagram of a portion of Fig. 3 of the drawings illustrating still another modification of the present invention.

In accordance with still another embodiment of the present invention, the current flowing in the saturating winding 72 may be controlled as a function of the plate current of the oscillation generator 11. Such an arrangement is disclosed in Fig. 8 of the drawings where the corresponding parts thereof are designated by the same reference numerals as in the preceding figures. Connected in the plate circuit of the oscillation generator 11 is a resistor 90 provided with a variable tap 91. A suitable capacitor 92 is preferably connected across the resistor 90 to by-pass the alternating current component or any high frequency component. As illustrated, the resistor 90 is connected between the cathode 14 of the electron discharge valve 12 and the mid-tap 38 of the secondary winding 32 of the rectifier transformer 29. The potential obtained at the variable tap 91 is applied to the same potentiometer circuit illustrated in Fig. 7 of the drawings and the corresponding parts thereof are designated by the same reference numerals. It will be observed, however, that the potential of the battery 88 is reversed as compared with the disclosure of Fig. 7 of the drawings. The signal applied to the potentiometer 87 is obviously a function of the plate current of the electron discharge valve 12. By balancing this signal against the voltage obtained from the direct current source 88 on potentiometer 87, the same operation of controlling the saturable reactor 67 will be obtained. If, for instance, the oscillation generator 11 is insufficiently loaded, the predominating voltage applied to the control electrode 83 of the electron discharge valve 80 will be supplied from the battery 88 and this is adjusted so as to be more positive the more predominant the battery voltage is. As a result the electron discharge valve 80 will be rendered more conductive thereby increasing the saturating current flowing in the saturating winding 72 and varying the phase of the potential applied to the primary winding 54 of the grid transformer 50 so as to advance the firing angle and thereby increase the loading of the oscillation generator 11. In the event that the oscillation generator 11 becomes overloaded, the signal picked up at the resistor 90 will predominate over the voltage of the battery 88, thus tending to render the electron discharge valve 80 less conductive with the end result that the firing angle is retarded so as to decrease the load on the oscillation generator 11.

While there have been shown and described particular embodiments of the present invention as applied to a high frequency heating apparatus, it is to be understood that the arrangements disclosed are merely illustrative of the invention. It will, of course, be apparent to those skilled in the art that changes and modifications may be made without departing from the present invention and it is aimed in the appended claims to cover all such changes and modifications as fall within the true spirit and scope of the present invention.

What is claimed as new and desired to be secured by Letters Patent of the United States is:

1. For use in a high frequency heating device of the type comprising a heating coil and a high frequency generator connected to supply said heating coil including an oscillation generator for producing high frequency oscillations in said heating coil and a source of alternating current potential, means including an electronic control unit and rectifier interposed between said source and said oscillation generator so that a variable direct current potential is supplied to said oscillation generator, said electronic control unit comprising a pair of three element electron discharge valves having their plate current circuits connected to said source, means for controlling the instant during the cycle of the alternating current potential of said source that said electron discharge valves are rendered conductive and means responsive to a current characteristic of said oscillation generator for controlling said last-mentioned means to maintain the power supplied to said heating coil constant during a heating cycle.

2. For use in a high frequency heating device comprising a heating coil and a high frequency generator connected to supply said heating coil including a vacuum tube for producing high frequency oscillations in said heating coil and a source of alternating current potential, means including an electronic control unit and rectifier interposed between said source and said oscillation generator so that a variable direct current potential is supplied to said oscillation generator, said electronic control unit comprising a pair of three element electron discharge valves having their plate current circuits connected to said source, means for controlling the instant during the cycle of the alternating current potential of said source that said electron discharge valves are rendered conductive, and means responsive to a function of the plate current of said vacuum tube for controlling said last-mentioned means to tend to maintain the power supplied to said heating coil constant during a heating cycle.

3. For use in a high frequency heating device comprising a heating coil and a high frequency generator connected to supply said heating coil including a vacuum tube for producing high frequency oscillations in said heating coil and a source of alternating current potential, means including an electronic control unit and rectifier interposed between said source and said oscillation generator so that a variable direct current potential is supplied to said oscillation generator, said electronic control unit comprising a pair of three element electron discharge valves having their plate current circuits connected to said source, means for controlling the instant during the cycle of the alternating current potential of said source that said electron discharge valves are rendered conductive and means responsive to a function of the grid current of said vacuum tube for controlling said last-mentioned means to tend to maintain the power supplied to said heating coil constant during a heating cycle.

4. For use in a high frequency heating device comprising a heating coil and an oscillation generator including a vacuum tube and tank circuit connected to supply said heating coil with high frequency oscillations and a source of alternating current potential, means including an electronic control unit and rectifier interposed between said source and said oscillation generator so that a variable direct current potential is supplied to said oscillation generator, said electronic control unit comprising a pair of three element electron discharge valves having their plate current circuits connected to said source, phase shifting means for controlling the instant during the cycle of the alternating current potential of said source that said electron discharge valves are rendered conductive, and means responsive to a current characteristic of said vacuum tube for controlling said last-mentioned means to tend to maintain the power supplied to said heating coil constant during a heating cycle.

5. In a control arrangement for controlling the current supplied between two circuits comprising, a load circuit, an alternating current supply circuit, an oscillation generator interconnecting said circuits, a pair of electron discharge valves arranged in back-to-back connection in series with one of said circuits, a control circuit for said electron discharge valves including an impedance bridge type phase shifting unit connected to said supply circuit, one element of said phase shifting unit having a variable impedance whereby the conductivity of said electron discharge valves may be varied, and means for automatically causing the impedance of said element to vary in response to a predetermined current characteristic of said oscillation generator.

6. In a control arrangement for controlling the power supplied between two circuits comprising, a load circuit, an alternating current supply circuit, an oscillation generator interconnecting said load and supply circuits, a pair of electron discharge valves arranged in back-to-back connection in series with one of said circuits, a control circuit for said electron discharge valves including an impedance bridge type phase shifting unit connected to said supply circuit, one element of said impedance bridge type phase shifting unit comprising a saturable reactor, a saturating circuit for said reactor to vary the impedance thereof, and means for controlling said saturating circuit in a predetermined manner to tend to maintain constant the power supplied to said load circuit.

7. For use in a high frequency heating device comprising a load circuit including an oscillation generator for generating high frequency oscillations and a high frequency heating coil connected to said generator and arranged to be inductively coupled with a work piece having a positive temperature coefficient of electrical resistivity and a source of alternating current potential connected to said load circuit through an electric circuit breaker, a pair of electron discharge valves arranged in back-to-back connection in series with said load circuit, and a control circuit for said electron discharge valves including an impedance bridge type phase shifting unit connected to said source so that the conductivity of said electron discharge valves may be varied by varying the impedance of one element of said phase shifting unit, and means for varying the impedance of said one element in response to a current characteristic of said oscillation generator so that the power supplied to said load circuit remains substantially constant throughout a heating cycle regardless of the change in temperature of said work piece.

8. For use in a high frequency induction heating device comprising a heating coil and an oscillation generator including a vacuum tube connected to supply said heating coil with high frequency oscillations and a supply circuit comprising a source of alternating current potential, a rectifier unit interconnecting said source and said generator for transforming said alternating current potential to direct current potential, said rectifier unit, oscillation generator and heating coil comprising a load circuit, a circuit breaker connected between said load and supply circuits, a pair of electron discharge valves connected in back-to-back relationship and in series with said load circuit, a control circuit for said electron discharge valves including an impedance bridge type phase shifting unit connected to said supply circuit, one element of said impedance bridge type phase shifting unit comprising a saturable reactor, a saturating circuit for said reactor to vary the impedance thereof and means for controlling said saturating circuit in response to a function of the grid current circuit of said vacuum tube.

HERBERT F. STORM.

REFERENCES CITED

The following references are of record in the file of this patent:

UNITED STATES PATENTS

| Number | Name | Date |
|---|---|---|
| 1,948,704 | Fischer | Feb. 27, 1934 |
| 2,057,485 | Haller | Oct. 13, 1936 |
| 2,147,689 | Chaffee | Feb. 21, 1939 |
| 2,151,753 | Etzrodt | Mar. 28, 1939 |
| 2,175,694 | Jones, Jr. | Oct. 10, 1939 |
| 2,231,457 | Stephen | Feb. 11, 1941 |
| 2,251,277 | Hart et al. | Aug. 5, 1941 |
| 2,293,851 | Rogers | Aug. 25, 1942 |
| 2,324,525 | Mittelmann | July 20, 1943 |
| 2,391,085 | Crandell | Dec. 18, 1945 |
| 2,400,472 | Strickland | May 14, 1946 |
| 2,415,799 | Reifel et al. | Feb. 11, 1947 |
| 2,416,172 | Gregory et al. | Feb. 18, 1947 |
| 2,441,435 | Mittelmann | May 11, 1948 |

FOREIGN PATENTS

| Number | Country | Date |
|---|---|---|
| 439,166 | Great Britain | Dec. 2, 1935 |

OTHER REFERENCES

Electronics, February, 1945, vol. 18, No. 2, pages 110–115.